United States Patent
Ulrey et al.

(10) Patent No.: US 9,108,607 B2
(45) Date of Patent: Aug. 18, 2015

(54) METHOD AND SYSTEM FOR VACUUM GENERATION

(71) Applicant: Ford Global Technologies, LLC, Dearborn, MI (US)

(72) Inventors: Joseph Norman Ulrey, Dearborn, MI (US); Ross Dykstra Pursifull, Dearborn, MI (US); Ralph Wayne Cunningham, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 268 days.

(21) Appl. No.: 13/670,644

(22) Filed: Nov. 7, 2012

(65) Prior Publication Data

US 2014/0123941 A1    May 8, 2014

(51) Int. Cl.
| | |
|---|---|
| B60T 13/46 | (2006.01) |
| B60T 13/52 | (2006.01) |
| F02D 9/08 | (2006.01) |
| F02M 35/10 | (2006.01) |
| F02B 29/04 | (2006.01) |
| F02D 9/02 | (2006.01) |
| F02B 37/16 | (2006.01) |

(52) U.S. Cl.
CPC ............ B60T 13/46 (2013.01); B60T 13/52 (2013.01); F02D 9/08 (2013.01); F02M 35/10118 (2013.01); F02M 35/10229 (2013.01); *F02B 29/0418* (2013.01); *F02B 37/16* (2013.01); *F02D 2009/024* (2013.01)

(58) Field of Classification Search
CPC ................ F02M 35/10229; F02D 2250/41; F02D 2009/024; F02D 7/00; B60T 13/46; B60T 13/52; B60T 13/72; B60T 11/00
USPC ............... 123/184.56, 339.23, 559.1, 563; 303/12; 60/397; 188/356
See application file for complete search history.

(56) References Cited

U.S. PATENT DOCUMENTS

| | | | |
|---|---|---|---|
| 6,138,648 A * | 10/2000 | Zentgraf | 123/563 |
| 6,394,760 B1 | 5/2002 | Tell | |
| 6,670,067 B2 | 12/2003 | Sato et al. | |
| 6,951,199 B2 | 10/2005 | Suzuki | |
| 7,174,883 B2 | 2/2007 | Sonoda et al. | |
| 2007/0295303 A1 | 12/2007 | Hirooka | |
| 2008/0264059 A1 | 10/2008 | Hirooka | |
| 2008/0267789 A1 | 10/2008 | Hirooka | |
| 2011/0132311 A1 | 6/2011 | Pursifull et al. | |

OTHER PUBLICATIONS

Pursifull, Ross Dykstra et al., "Throttle Valve System for an Engine," U.S. Appl. No. 13/417,072, filed Mar. 9, 2012, 36 pages.
Beshay, Mansour et al., "Aspirator for Crankcase Ventilation and Vacuum Generation," U.S. Appl. No. 13/549,226, filed Jul. 13, 2012, 43 pages.

* cited by examiner

*Primary Examiner* — Mahmoud Gimie
(74) *Attorney, Agent, or Firm* — Julia Voutyras; Alleman Hall McCoy Russell & Tuttle LLP (57) ABSTRACT

Methods and systems are provided for improving the vacuum generation efficiency of an ejector coupled to in an engine system. Vacuum is generated at the ejector at a faster rate but to a lower level by opening a throttle upstream of the ejector. Vacuum is then raised to a higher level but at a slower rate by closing the throttle upstream of the ejector.

21 Claims, 5 Drawing Sheets

METHOD AND SYSTEM FOR VACUUM GENERATION

FIELD

The present invention relates to improving the vacuum generation efficiency of an ejector coupled to an engine system.

BACKGROUND/SUMMARY

Vehicle systems may include various vacuum consumption devices that are actuated using vacuum. These may include, for example, a brake booster. Vacuum used by these devices may be provided by a dedicated vacuum pump. In still other embodiments, one or more ejectors may be coupled in the engine system that may harness engine airflow and use it to generate vacuum.

The inventors herein have recognized that ejector configurations may cease to provide increasing vacuum with decreasing outlet pressure. The inventors have further discovered that ejectors can continue to provide increasing vacuum with decreasing outlet pressure if the pressure at the motive inlet port is reduced. Thus, by throttling the motive air flow rate through an ejector in such a way to maintain the pressure ratio of the ejector (that is, the ejector outlet pressure relative to the ejector motive flow inlet pressure) at or above a threshold ratio (e.g., at or above 0.71), an existing ejector may continue to produce deeper ultimate vacuums even as the source vacuum is reduced.

In one example, the above issue may be at least partly addressed by a method for an engine comprising: closing a throttle upstream of an ejector coupled to an intake manifold to increase level of vacuum generation by the ejector during a first mode of operation; and opening the throttle to increase rate of vacuum generation by the ejector during a second mode of operation. In this way, a fast vacuum pump-down is achieved at lower manifold vacuums and a deeper yet vacuum is achieved at the ejector at higher manifold vacuums.

As an example, an engine system may include an ejector coupled to an intake manifold in a conduit coupled upstream of a charge air cooler, the conduit in parallel to an air intake passage. A first ejector throttle may be coupled immediately upstream of the ejector, without other devices or flow couplings there-between, for enabling pressure reduction at the ejector. A second air intake throttle may be coupled to the intake manifold, downstream of the charge air cooler, in the air intake passage. During conditions when intake manifold vacuum is lower, at least a portion of intake air may flow through the ejector in the conduit with the first throttle open a first amount to generate vacuum for an engine vacuum consumption device (such as a brake booster). By flowing air through the ejector with the first throttle more open, the high suction flow rate or pumping flow rate through the ejector can be advantageously used to rapidly raise a vacuum level of the vacuum consumption device. However, the ultimate vacuum level attained may not be deep enough, for example, the level attained may be lower than a desired vacuum level. When intake manifold vacuum is higher (such as during low load conditions), the desired vacuum level may be attained by flowing air through the ejector with the first throttle open a second amount that is more closed than the first amount. By flowing air through the ejector with the first throttle more closed, a pressure upstream of the ejector can be lowered to raise the ultimate vacuum level to the desired vacuum level, albeit at a lower pumping flow rate. Adjustments to the first throttle may be compensated for by corresponding adjustments to the second throttle to maintain air flow to the intake manifold. Thus, when an opening of the first throttle is increased, an opening of the second throttle may be correspondingly decreased, and vice versa.

In this way, each of a high vacuum pumping rate and a deeper ultimate vacuum can be achieved using an existing engine system ejector. By opening a throttle immediately upstream of the ejector to raise an upstream pressure, a rapid vacuum pump-down can be achieved during lower manifold vacuums. Then, by closing the throttle upstream of the ejector to lower the upstream pressure, a deeper yet vacuum level can be achieved during higher manifold vacuums at a slower pumping rate. In one example, the deeper vacuum may be advantageously used to provide vacuum to a brake booster for a single brake stop at a high g-force (e.g., a "panic stop"). Overall, a vacuum generation efficiency of the ejector is increased without substantially increasing component cost or complexity.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

The subject matter of the present disclosure will be better understood from reading the following detailed description of non-limiting embodiments, with reference to the attached drawings, wherein.

DETAILED DESCRIPTION

Figure 1:
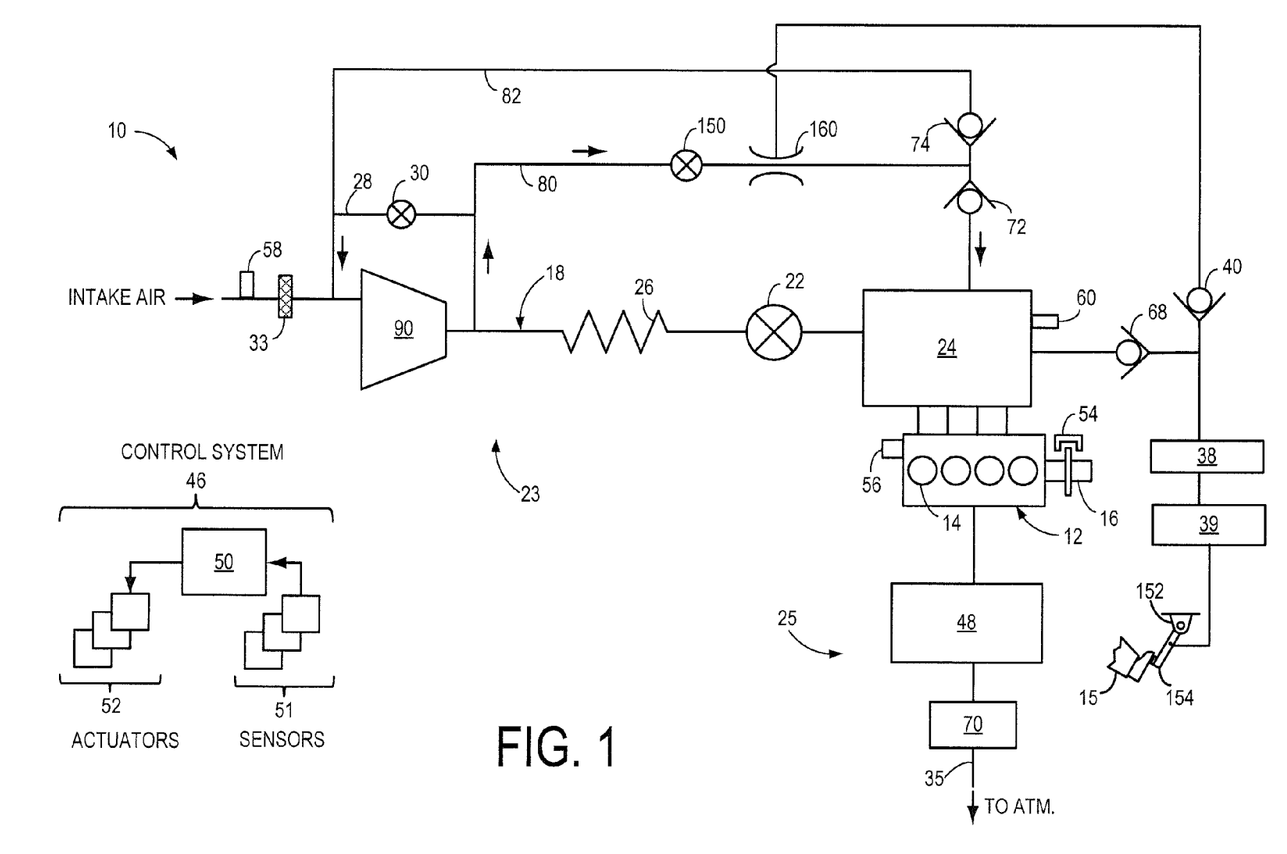
FIG. 1 shows a schematic depiction of an engine system including an ejector and a throttle coupled upstream of the ejector.
Figure 2:
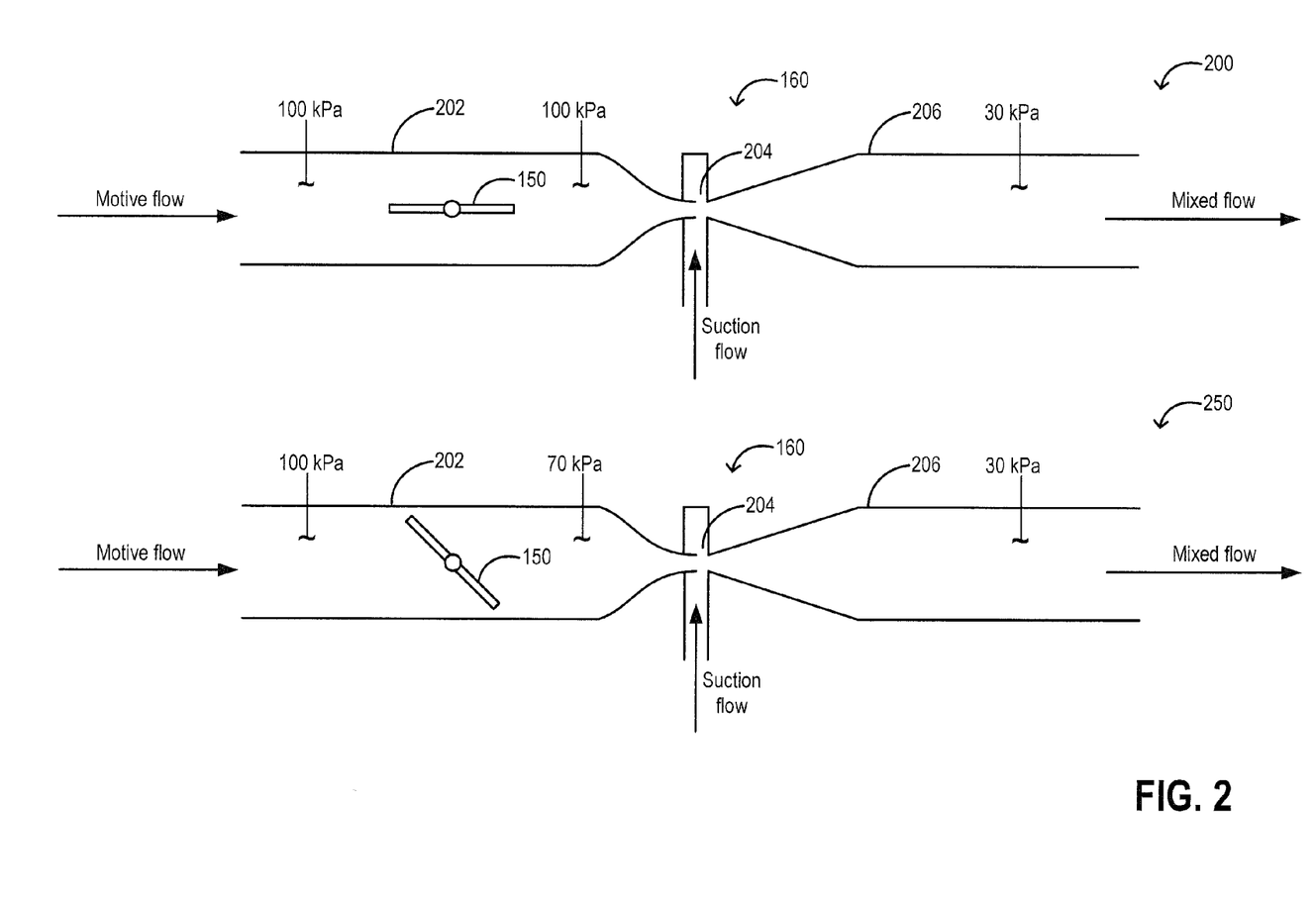
FIG. 2 depicts embodiments of the ejector with the upstream throttle in an open or a closed position.
Figure 3:
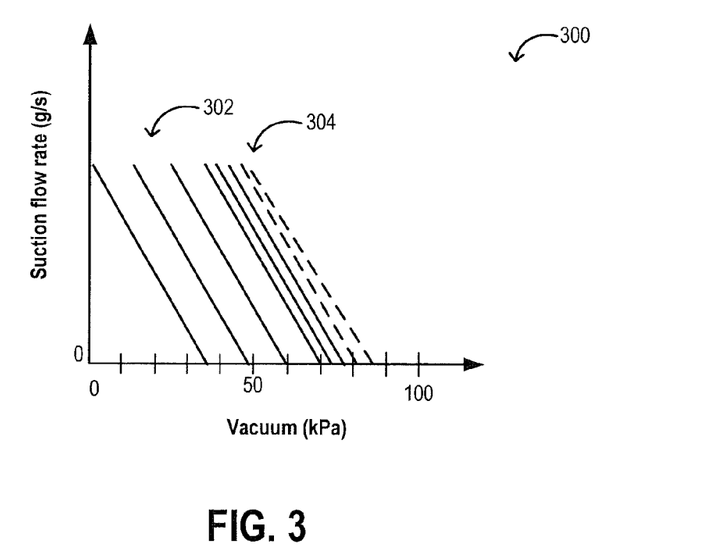
FIG. 3 shows a map of vacuum generation at the ejector when throttled and un-throttled.

Methods and systems are provided for improving vacuum generation at an ejector coupled to an engine system, such as the engine system of FIG. 1. A throttle may be coupled immediately upstream of the ejector, as shown at FIG. 2, and a position of the throttle may be adjusted to vary a pressure upstream of the ejector (FIG. 3). By selectively reducing the pressure upstream of the ejector, a deeper vacuum may be achieved at a lower suction rate. A controller may be configured to perform a control routine, such as the example routine of FIG. 4, to operate the ejector in a first mode with the throttle open to generate a lower level of vacuum at a faster rate, or in a second mode with the throttle closed to generate a higher level of vacuum at a slower rate. Example adjustments are described at FIGS. 5-6. In this way, the benefits of both a higher vacuum pump-down rate as well as a deeper vacuum pump-down may be achieved. FIG. 1 shows an example engine system 10 including an engine 12. In the present example, engine 12 is a spark-ignition engine of a vehicle, the engine including a plurality of cylinders 14, each cylinder including a piston. Combustion events in each cylinder 14 drive the pistons which in turn rotate crankshaft 16, as is well known to those of skill in the art. Further, engine 12 may include a plurality of engine valves, the valves coupled to the cylinders 14 and controlling the intake and exhaust of gases in the plurality of cylinders 14.

Engine 12 includes an engine intake 23 and an engine exhaust 25. Engine intake 23 includes an air intake throttle 22 fluidly coupled to an engine intake manifold 24 along an intake passage 18. Air may enter intake passage 18 from an air intake system (AIS) including an air cleaner 33 in communication with the vehicle's environment. A position of throttle 22 may be varied by a controller 50 via a signal provided to an electric motor or actuator included with the throttle 22, a configuration that is commonly referred to as electronic throttle control (ETC). In this manner, the throttle 22 may be operated to vary the intake air provided to the intake manifold and the plurality of cylinders 14. The intake 23 may include a mass air flow sensor 58 (in intake passage 18) and a manifold air pressure sensor 60 (in intake manifold 24) for providing respective signals MAF and MAP to the controller 50.

Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein.

In some embodiments, engine system 10 is a boosted engine system, where the engine system further includes a boosting device. In the present example, intake passage 18 includes a compressor 90 for boosting an intake aircharge received along intake passage 18. A charge air cooler 26 (or intercooler) is coupled downstream of compressor 90 for cooling the boosted aircharge before delivery to the intake manifold. In embodiments where the boosting device is a turbocharger, compressor 90 may be coupled to, and driven by a turbine (not shown) in the engine exhaust 25 of engine system 10. Further compressor 90 may be, at least in part, driven by an electric motor or crankshaft 16.

An optional bypass passage 28 may be coupled across compressor 90 so as to divert at least a portion of intake air compressed by compressor 90 back upstream of the compressor. An amount of air diverted through bypass passage 28 may be controlled by opening compressor bypass valve (CBV) 30 located in bypass passage 28. By controlling CBV 30, and varying an amount of air diverted through the bypass passage 28, a boost pressure provided downstream of the compressor can be regulated. This enables boost control and surge control.

A conduit 80, parallel to air intake passage 18, may be configured to divert a portion of the intake air received from the air cleaner 33 to intake manifold 24 via an ejector 160. Conduit 80 may be coupled to air intake passage 18 at a point upstream of charge air cooler 26 and downstream of compressor 90. Ejector 160 may be an ejector, injector, eductor, venturi, jet pump, or similar passive device. As further elaborated at FIG. 2, ejector 160 may have an upstream motive flow inlet via which air enters the ejector, a throat or entraining inlet communicating with a vacuum reservoir 38 via a first check valve 40, and a mixed flow outlet via which air that has passed through ejector 160 can exit and be directed to intake manifold 24. The ejector outlet may be coupled to intake manifold via check valve 72. Check valve 72 may allow air flow to be retained in the intake manifold and not flow backwards through ejector 160 when an air pressure in the intake manifold is higher than an air pressure in conduit 80 As such, if air pressure in the intake manifold is higher, air may flow through the ejector and into conduit 82, from where the air may be directed back to the intake passage, upstream of compressor 90. A direction of flow through conduit 82, from downstream of the ejector to upstream of the compressor may be ensured by check valve 74. As such, the high pressure point in the depicted system (compressor outlet) may always connects to the ejector inlet and the ejector outlet point is automatically routed to the lowest pressure point via the check valves. In alternate embodiments, the actively controlled valves may be used in place of the passive check valves if it is cost effective.

Air flowing through the motive inlet may be converted to flow energy in the ejector 160, thereby creating a low pressure communicated to the throat (or entraining inlet) and drawing a vacuum at the throat. The first check valve 40 allows vacuum reservoir 38 to retain any of its vacuum should the pressures in the ejector's motive inlet and the vacuum reservoir equalize. In the present example, the ejector is a three port device including a motive inlet, a mixed flow outlet, and a throat/entraining inlet. However, in alternate embodiments of the aspirator, a check valve, such as check valve 40, may be integrated into the ejector.

Vacuum reservoir 38 may also receive vacuum directly from intake manifold 24. A second check valve 68 allows vacuum reservoir 38 to retain any of its vacuum should the pressure in the intake manifold 24 and the vacuum reservoir equalize. Check valve 68 is referred to as the bypass path, providing a high flow rate path for air from the booster to the intake manifold. This flow path dominates when while booster pressure is above manifold pressure. Vacuum reservoir 38 may be coupled to an engine vacuum consumption device 39. For example, vacuum consumption device 39 may be a brake booster coupled to vehicle wheel brakes wherein vacuum reservoir 38 is a vacuum cavity behind a diaphragm of the brake booster. Therein, vacuum reservoir 38 may be an internal vacuum reservoir configured to amplify a force provided by a vehicle operator 15 via a brake pedal 154 for applying vehicle wheel brakes (not shown). A position of the brake pedal 154 may be monitored by a brake pedal sensor 152. In an alternate example, the vacuum reservoir may be a low pressure storage tank included in a fuel vapor purge system.

Conduit 80 may further include a throttle 150 coupled immediately upstream of ejector 160. In particular, throttle 150 may be coupled to ejector 160 with no flow devices or couplings in between the ejector and the throttle. As used herein, throttle 150 coupled to ejector 160 in conduit 80 may be a first throttle (herein also referred to as an ejector throttle) while throttle 22 coupled to intake manifold 24 in air intake passage may be a second throttle (herein also referred to as an air intake throttle). In this way, engine system 10 may include a first throttle coupled to the intake manifold upstream of charge air cooler 26 and a second throttle coupled to the intake manifold downstream of charge air cooler 26.

Figure 4:
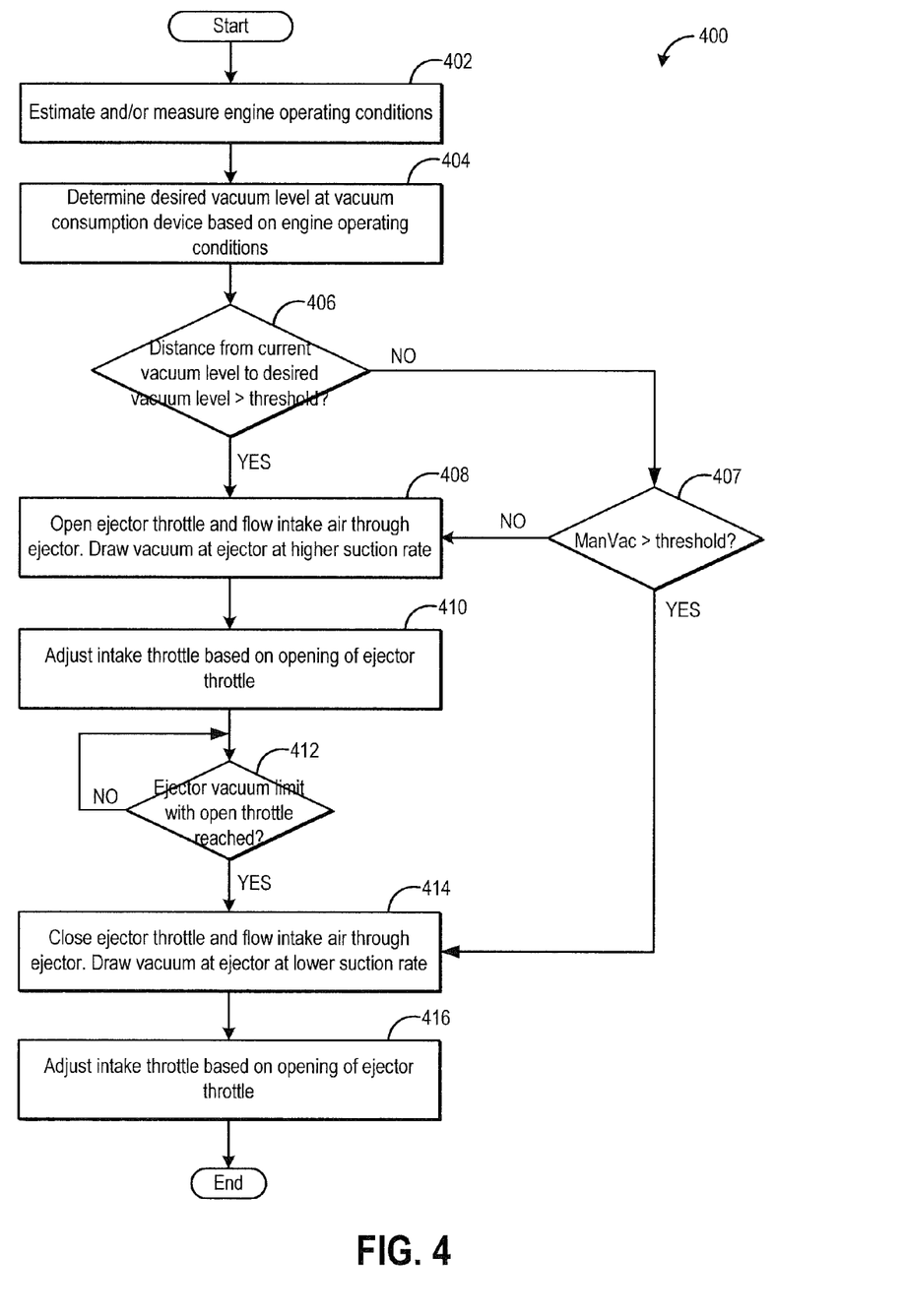
FIG. 4 shows a high level flow chart illustrating a routine that may be implemented for controlling the opening of the ejector throttle to improve vacuum generation efficiency.

As elaborated with reference to FIGS. 2-4, controller 50 may be configured to adjust an opening of first throttle 150 to vary a pressure in an upstream region of the ejector, thereby affecting the suction flow rate at the ejector as well as the ultimate vacuum achieved at the ejector. In particular, the controller may set the first throttle to a first position where it is open to a higher degree (e.g., fully open or more open) to increase the pressure upstream of the ejector, thereby increasing a suction flow rate and enabling a rate of vacuum pull-down at the ejector to be increased. For example, first throttle 150 may be shifted to the first, more open position during conditions when manifold vacuum is lower (e.g., during boosted engine operation). By flowing air through ejector 160 with first throttle 150 more open, the high suction flow rate or pumping flow rate through the ejector can be advantageously used to rapidly raise a vacuum level of vacuum reservoir 38, so that sufficient vacuum is available for use by vacuum consumption device 39. However, the ultimate vacuum level attained may not be sufficiently deep (e.g., the vacuum level may be lower than a desired vacuum level).

Thus, in another example, controller 50 may set first throttle 150 to a second, different position where it is open to a smaller degree (e.g., fully closed or more closed relative to the first position) to decrease the pressure upstream of the ejector, thereby decreasing a suction flow rate and enabling a level of vacuum pulled down at the ejector to be increased at a slower rate. For example, first throttle 150 may be shifted to the second, more closed position during conditions when manifold vacuum is higher (e.g., during non-boosted engine operation). By flowing air through ejector 160 with first throttle 150 less open, the deeper ultimate vacuum level achieved through the ejector can be advantageously used to raise the vacuum level of vacuum reservoir 38 to the desired level, even though the increase may be at a slower rate than when vacuum is generated at the ejector with the first throttle in the first, more open position.

Adjustments to first throttle 150 may be compensated for by corresponding adjustments to second throttle 22. By performing corresponding adjustments, an air flow to the engine intake manifold is maintained at a desired level. As an example, responsive to an opening of the first throttle being increased (such as when the first throttle is moved towards the first, more open position), an opening of the second throttle may be correspondingly decreased (e.g., the second throttle may be moved to a more closed position). Likewise, responsive to an opening of the first throttle being decreased (such as when the first throttle is moved towards the second, less open position), an opening of the second throttle may be correspondingly increased (e.g., the second throttle may be moved to a more open position).

Engine system 10 may also include a control system 46 including a controller 50, sensors 51 and actuators 52. Example sensors include engine speed sensor 54, engine coolant temperature sensor 56, a mass air flow sensor 58, and manifold air pressure sensor 60. Example actuators include engine valves, CBV 30, first ejector throttle 150, and second air intake throttle 22. Controller 50 may further include a physical memory with instructions, programs and/or code for operating the engine. An example routine executed by controller 50 is shown at FIG. 4.

In this way, the system of FIG. 1 provides an engine system that is capable of closing a throttle upstream of an ejector coupled to an intake manifold to increase level of vacuum generation by the ejector during a first mode of operation. Then, during a second mode of operation, the system is capable of opening the throttle to increase rate of vacuum generation by the ejector. Herein, the throttle may be closed to a greater degree during the first mode of operation and then closed to a smaller degree during the second mode of operation. In other words, the throttle may be opened to a smaller degree during the first mode of operation and then opened to a larger degree during the second mode of operation.

Now turning to FIG. 2, an example embodiment of the intake ejector of FIG. 1 with the first throttle coupled upstream of it is shown. In particular, FIG. 2 shows an embodiment of the ejector being operated with the upstream ejector throttle open at 200 and an embodiment of the ejector being operated with the throttle closed at 250. It will be appreciated that components previously introduced at FIG. 1 are numbered similarly in FIG. 2 and are not reintroduced.

Ejector 160 may receive motive flow in an upstream region 202 of the ejector. The upstream region corresponds to a region of the ejector that is located upstream of the ejector throat 204. Following passage through the throat 204, a mixed flow may flow into a downstream region 206 of the ejector, that is, a region located downstream of the ejector throat. Due to the narrowed area at the ejector throat, a velocity of air flowing through the ejector may increase at the throat (relative to the velocity of the air in the upstream or downstream region), and a pressure of the air flow may correspondingly reduce (relative to the pressure of the air in the upstream or downstream region) due to a venturi effect (a.k.a. Bernoulli Effect). As such, the motive velocities remain sonic at the throat while the velocity increases. If the flow rate is sufficient, sonic velocities form at the throat. After the throat, the velocities may go supersonic (as in a Laval nozzle). The drop in pressure can be drawn out of the throat as a vacuum, and is also known as a suction flow. The velocity at the throat, therefore, determines not only the suction flow rate but also the ultimate vacuum that is achieved. As used herein, the ultimate vacuum refers to the vacuum achieved at zero suction flow rate.

The inventors herein have recognized that the velocity at the throat, and consequently the suction flow rate and ultimate vacuum, may vary based on the pressure difference across the throat of the ejector. In particular, by keeping the pressure ratio from falling below a threshold ratio (for example, from falling below an empirically determined ratio of 0.71) ejector performance can optimized in all conditions. As such, throttling raises the ejector's pressure ratio. Thus, by changing the pressure in an ejector's upstream region, characteristics of a vacuum generated at the ejector can be changed. In particular, a throttle 150 positioned immediately upstream of the ejector, with no flow device or flow coupling in between the ejector and the throttle, can be advantageously used to vary the pressure in the upstream region of the ejector, and thereby provide a desired ultimate vacuum or desired suction flow rate.

As described at FIG. 1, the upstream throttle 150 and the ejector 160 may be coupled to the intake manifold in a conduit parallel to an air intake passage with the conduit coupled to the air intake passage upstream of a charge air cooler. During conditions when manifold vacuum is lower (such as moderate load conditions), at least a portion of intake air may be directed into the conduit where the air flows through the ejector with the throttle open by a first, larger amount (or at a first, more open position) to generate vacuum for an engine vacuum consumption device (such as a brake booster). By flowing air through the ejector with the first throttle more open, the high suction flow rate or pumping flow rate through the ejector is advantageously used to rapidly raise a vacuum level of the vacuum consumption device to a first level.

FIG. 2 shows the throttle in a first position, open by a first (larger) amount, at 200. Herein, when throttle 150 is more open (e.g., fully open, as shown), a pressure in the upstream region 202 of the ejector (on either side of throttle 150) may be ~100 kPa while a pressure in the downstream region 206 of the ejector may be ~30 kPa. That is, there may be no pressure difference across throttle 150 in the upstream region while the pressure difference across the ejector throat 204 is higher (herein ~70 kPa). This higher pressure difference across the throat area leads to a higher velocity of motive air flow across the throat, and consequently a higher suction flow rate. However, the ultimate vacuum achieved may be lower. For example, the ultimate vacuum achieved may be ~65 kPa.

As such, this first level of ultimate vacuum achieved may be lower than a desired vacuum level. Therefore, to achieved the desired vacuum level, during conditions when manifold vacuum is higher (such as during non-boosted conditions), air may be flowed into the conduit and through the ejector with the throttle open by a second amount (or at a second position) that is smaller than the first amount. Herein, the second position may be a position where the throttle is more closed than when the throttle was in the first position. By flowing air through the ejector with the throttle more closed, a pressure upstream of the ejector can be lowered to raise the ultimate vacuum level to the desired vacuum level, albeit at a lower suction flow rate.

FIG. 2 shows the throttle in a second position, open by a second (smaller) amount, at 250. Here the throttle opening is reduced (e.g., fully closed, as shown, or partially closed). Herein, when throttle 150 is more closed, a pressure in the upstream region 202 of the ejector, upstream of the throttle, may be ~100 kPa while a pressure in the upstream region 202 of the ejector, downstream of the throttle may be ~70 kPa. That is, by adjusting the position of the throttle, a pressure in the ejector upstream region is lowered by ~30 kPa. This drop in pressure leads to a drop in motive flow velocity across the throat and a reduced pressure difference across the throat. In the depicted example, the ejector area immediately upstream of the throat may be at ~70 kPa while a pressure in the downstream region of the ejector may be ~30 kPa. That is, there may be a smaller pressure difference across the ejector throat area (herein ~40 kPa), as compared to when the throttle is more open in the first position. This lower pressure difference across the throat area leads to a lower drop in pressure at the throat, and consequently a lower suction flow rate. However, the ultimate vacuum level may be higher. For example, the ultimate vacuum level may be 80 kPa. Thus, by shifting the throttle from the first more open position (at 200) to the second more closed position (at 250), the ultimate vacuum is raised from a first, lower level to a second, higher level. In this way, by throttling the ejector, a pressure upstream of the ejector is reduced, a suction flow rate across the aspirator throat is reduced, but a deeper vacuum level can be achieved.

It will be appreciated that while the example of FIG. 2 shows the throttle being shifted from a first position (at 200) where it is fully open to a second position (at 250) where it is fully closed, this is not meant to be limiting. In alternate embodiments, the throttle may be shifted from a first position where it is open to a higher degree to a second position where it is closed to a higher degree to achieve the desired pressure reduction and deeper ultimate vacuum. Further still, the throttle position may be controlled continuously to a position anywhere between a fully open and a fully closed position. In particular, the throttle position may be continuously varied to prevent the pressure ratio from falling below a threshold pressure ratio (e.g., below 0.71).

Map 300 of FIG. 3 depicts this effect graphically. In particular, map 300 depicts aspirator performance for increasing levels of manifold vacuum. Set of lines 302 (solid lines) depict aspirator performance when the aspirator is operated un-throttled (that is, with an upstream pressure of up to 100 kPa). In particular, set of lines 302 depict aspirator performance when un-throttled at manifold pressures of 10, 15, 20, 25, 30, 40, and 50 kPa respectively (from left to right). Set of lines 304 (dashed lines) depict aspirator performance when the aspirator is operated throttled (that is, with an upstream pressure of up to 70 kPa). In particular, set of lines 304 depict aspirator performance when throttled at manifold pressures of 50 and 55 kPa respectively (from left to right).

Upon closer examination, it will be observed that the lines bunch up at a threshold pressure ratio, herein 0.71 pressure ratio (at or around 70 kPa). Therefore, a control action may be performed when the pressure ratio at the ejector approaches the threshold pressure ratio of 0.71. In particular, when the pressure ratio gets to 0.71, the ejector inlet may be throttled to prevent the pressure ratio from falling below 0.71 (that is, to maintain the pressure ratio at or above the threshold pressure ratio of 0.71). In this way, the ejector performance is always optimized for both suction flow and vacuum.

Also, the system provides unexpected serendipitous and synergistic benefits. The throttled air flow reduces motive air flow rate and thus bypass flow rate around the throttle plate. Consequently, even higher manifold vacuums can be attained if the air flow rate around the throttle plate is reduced. This in turn increases manifold vacuum. This is because flow through a sonic nozzle is a function of the density upstream of that nozzle. The converging cone of the ejector performs like a sonic nozzle. The maximum flow through that nozzle is reached typically at a pressure ratio of 0.9 where the motive flow goes sonic.

In one example, when the ejector is operated un-throttled (that is, with the throttle more open), a rate of suction flow drawn at the throat is higher (that is, a steeper slope is seen), while the ultimate vacuum achieved is lower (e.g., ~65 kPa). In comparison, when the ejector is operated throttled (that is, with the throttle more closed), a rate of suction flow drawn at the throat is lower (that is, a shallower slope is seen), while the ultimate vacuum achieved is higher (e.g., ~80 kPa).

As elaborated herein at FIG. 4, a controller may operate the ejector un-throttled, with the throttle open by a first, larger amount, for a first duration to rapidly raise a vacuum level to a first, lower vacuum level. Subsequently, the controller may operate the ejector throttled, with the throttle open by a second, smaller amount, for a second duration to slowly raise the vacuum level from the first, lower vacuum level to a second, higher vacuum level. In this way, the benefits of both a higher vacuum pump-down and a deeper vacuum pump-down can be achieved with an existing ejector in a cost-effective and simple manner.

As such, the deeper vacuum may provide various advantages. As one example, where the ejector is configured to provide vacuum to a brake booster, the vacuum may be used by the brake booster for high-g, single brake stops from high vehicle speed. While the deep vacuum may have limited usefulness for a quick brake vacuum recovery, the vacuum may be used by the brake booster to stop the vehicle in the event of a "panic stop".

Now turning to FIG. 4, a method 400 for controlling the operation of a throttle coupled upstream of an intake manifold ejector is shown. The method is used to improve the vacuum generation efficiency of the ejector.

At 402, the method includes estimating and/or measuring engine operating conditions. These may include, for example, engine speed, engine temperature, vehicle speed, ambient conditions (barometric pressure, ambient temperature and humidity), catalyst temperature, vacuum level in vacuum reservoirs coupled to engine vacuum consumption devices (or vacuum actuators), etc.

At 404, based on the estimated engine operating conditions, a vacuum level desired in a vacuum reservoir coupled to an engine vacuum consumption device may be determined. The vacuum in the vacuum reservoir may be used to actuate the vacuum consumption device. In one example, the vacuum consumption device is a brake booster coupled to vehicle wheel brakes. Therein, the controller may determine a vacuum level required for operation of the brake booster. The desired vacuum level may be based on, for example, a vehicle speed. Thus, as a vehicle speed increases, the desired vacuum level may increase so that the brake booster can bring the vehicle to a stop if a brake pedal is applied by a vehicle operator when the vehicle is operating at high vehicle speeds. In alternate examples, the vacuum consumption device may be an alternate vacuum actuator, such as a speed control actuator, HVAC door, etc.

At 406, it may be determined if a distance of the current vacuum consumption device vacuum level from the desired vacuum consumption device vacuum level is higher than a threshold. For example, it may be determined if a difference between the current vacuum level at the brake booster and the desired vacuum level at the brake booster is more than the threshold. As such, the current vacuum consumption device vacuum level may be a level of vacuum currently available in a vacuum reservoir coupled to the vacuum consumption device. The threshold may be based on a vacuum level that can be generated at a current (ejector) throttle opening.

If the distance from the desired vacuum level is higher than the threshold, then at 408, the method includes opening the ejector throttle (or increasing an opening of the ejector throttle) to increase a pressure in the upstream region of the ejector and flowing intake air through the ejector. Vacuum may then be drawn from the throat of the ejector. Opening the ejector throttle includes fully opening the ejector throttle or increasing an opening of the ejector throttle from the current degree of opening of the throttle. For example, the throttle may be moved from a current setting to a first position where the throttle is more open. By setting the throttle upstream of the ejector to be more open, a velocity of motive flow at the throat of the ejector may be increased, increasing a suction flow rate. Thus, vacuum may be rapidly increased, albeit to a lower ultimate vacuum level.

At 410, the method includes adjusting the opening of an air intake throttle based on the opening of the ejector throttle. As previously elaborated, the ejector may be coupled to the intake manifold in a conduit parallel to an air intake passage with the conduit coupled to the air intake passage upstream of a charge air cooler. The throttle upstream of the ejector may be a first throttle positioned in the conduit immediately upstream of the ejector with no flow device or coupling in between the ejector and the first throttle. The engine may further include a second throttle coupled to the intake manifold in the air intake passage downstream of the charge air cooler. The controller may adjust a setting of the second throttle based on the first throttle. In particular, at 410, an opening of the second throttle may be decreased in response to the opening of the first throttle. For example, as the first throttle is moved to a more open position, the second throttle may be moved to a more closed position to allow a net engine air flow to be maintained.

As more air exits the ejector, the main throttle is closed so that the engine target air flow rate is met. As such, the flow rate out of the ejector tends to be largely constant even if the suction flow rate varies. Said another way, the suction flow tends to displace motive flow rate instead of adding to it. Thus, for constant conditions at the motive flow input and the ejector exist, the exhausting air flow rate is largely constant even under varying suction flow rate.

At 412, it may be confirmed that a vacuum limit of the ejector with the ejector throttle open has been reached. That is, it may be determined if the ejector has reached the ultimate vacuum achievable at the first throttle position. While the ejector may reach this ultimate vacuum level quickly due to the throttle being more open, the ultimate vacuum level may be lower than the desired vacuum level. Thus, to reach the desired, deeper vacuum level, at 414, the method includes closing the ejector throttle (or decreasing an opening of the throttle) to decrease a pressure in the upstream region of the ejector and flowing intake air through the ejector. Vacuum may then be drawn from the throat of the ejector. Closing the ejector throttle includes fully closing the ejector throttle or decreasing an opening of the ejector throttle. For example, the throttle may be moved from the first position where the throttle was more open (or less closed) to a second position where the throttle is more closed (or less open). By setting the throttle upstream of the ejector to be more closed, a velocity of motive flow at the throat of the ejector may be decreased, decreasing a suction flow rate, but increasing an ultimate vacuum that is achieved. Thus, vacuum may be slowly increased to a deeper yet ultimate vacuum.

At 418, the method includes adjusting the opening of an air intake throttle based on the opening of the ejector throttle. As previously elaborated, the controller may adjust a setting of the second throttle coupled in the air intake passage based on the first throttle coupled upstream of the ejector. In particular, at 418, an opening of the second throttle may be increased in response to the closing of the first throttle. For example, as the first throttle is moved to a more closed position, the second throttle may be moved to a more open position to allow a net engine air flow to be maintained.

In this way, when a larger amount of vacuum generation is required, the engine may be operated in each of two modes with a first mode of vacuum generation wherein a throttle upstream of an ejector is moved to a more open position to increase a rate of vacuum generation by the ejector, and with a second mode of vacuum generation wherein the throttle is moved to a more closed position to increase a level of vacuum generation by the ejector.

Returning to 406, if the distance from the desired vacuum level is lower than the threshold, then at 407, it may be determined if manifold vacuum is higher than a threshold vacuum. In one example, manifold vacuum may be higher than a threshold vacuum during non-boosted engine operation. If the manifold vacuum is higher than the threshold vacuum and the distance to the desired vacuum level is smaller than a threshold (that is, the vacuum consumption device vacuum level is already sufficiently high), then the routine directly proceeds to 414 to provide the deeper vacuum. That is, the desired vacuum level is achieved by closing the throttle (e.g., moving the throttle to the second, more closed position) to provide the deeper vacuum at a slower rate. Herein, the engine is operated only in the second mode to reach the desired vacuum level at a slower suction flow rate when the desired vacuum level is less than a threshold and when an intake manifold vacuum is higher than a threshold level.

If the distance from the desired vacuum level is lower than the threshold (at 406) and the intake manifold vacuum is lower than the threshold vacuum (at 407), the routine directly proceeds to 408 to quickly provide the desired vacuum. In one example, manifold vacuum may be lower than the threshold vacuum during boosted engine operation. That is, the desired vacuum level is achieved by opening the throttle (e.g., moving the throttle to the first, more open position) to provide the desired vacuum at a faster rate. Herein, the engine may be operated only in the first mode to reach the desired vacuum level at a faster suction flow rate when the desired vacuum level is less than a threshold and when an intake manifold vacuum is lower than a threshold level.

In this way, when a smaller amount of vacuum generation is required, the engine may be operated in one of the two modes based on a manifold vacuum level. By operating in the first mode of vacuum generation with the throttle upstream of the ejector in the more open position when manifold vacuum is lower, the desired vacuum level can be rapidly attained. By operating in the second mode of vacuum generation with the throttle upstream of the ejector in the more closed position when manifold vacuum is higher, the desired vacuum level can be achieved even though the manifold vacuum is high, albeit at a slower rate of vacuum generation. By adjusting an opening of a second throttle coupled to the intake manifold downstream of the charge air cooler based on the first throttle during each of the first and second mode of operation, an air flow to the engine may be maintained.

As such, during conventional ejector operation, the motive flow inlet of an ejector is exposed to a high pressure (e.g. compressor outlet) and the air is exhausted to a low pressure (e.g. intake manifold pressure). While this works above a threshold pressure ratio, as the pressure ratio (as determined by the ratio of MAP/TIP) goes below the threshold ratio (e.g., below 0.71), ejector effectiveness drops. Thus, by reducing pressure to the ejector's motive inlet such that the pressure ratio does not drop below 0.71, deeper suction vacuums can be attained even while reducing throttle bypass flow (that is, motive air flow rate).

Figure 5:
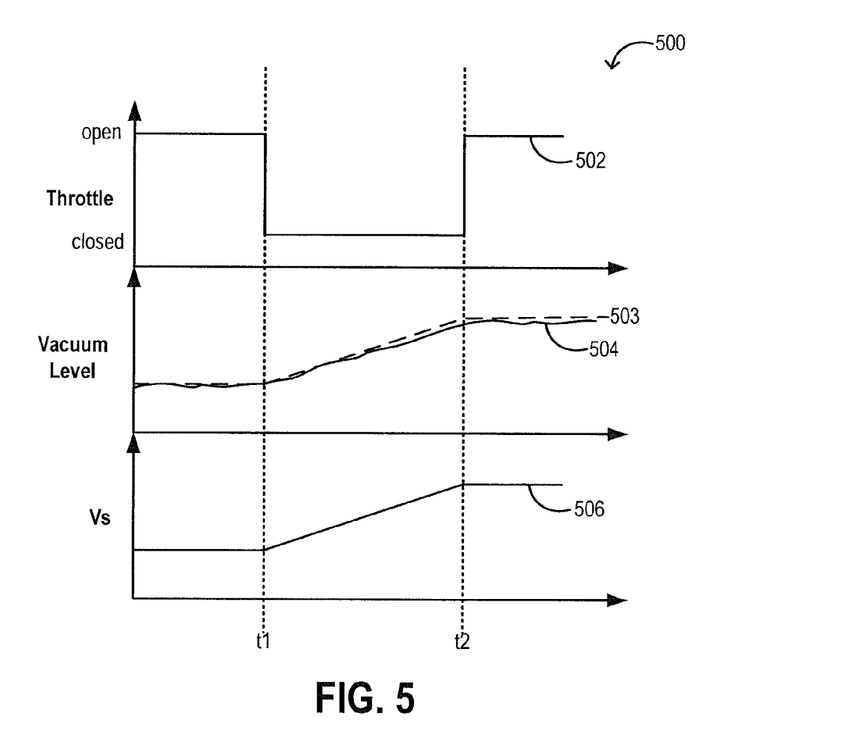
FIGS. 5-6 show example ejector throttle adjustments performed during vacuum generation at an ejector.

Now turning to FIG. 5, map 500 depicts vacuum generation at an ejector coupled to an engine intake manifold in a vehicle system. Map 500 further depicts example adjustments to a throttle positioned immediately upstream of the ejector performed while flow is directed through the ejector so as to vary a rate of vacuum pump-down as well as an ultimate vacuum level attained at the ejector. Map 500 depicts changes to an ejector throttle position at plot 502. Changes to a vacuum level in a reservoir coupled to a vacuum consumption device of the engine are shown at plot 504 and changes to a vehicle speed are shown at plot 506. All graphs are plotted over time along the x-axis.

In the present example, the ejector is configured to provide vacuum to a brake booster. Prior to t1, the vehicle may be running at a first, lower vehicle speed (plot 506). Due to the lower vehicle speed, the desired vacuum level 503 at the brake booster may be lower. The smaller vacuum requirement may be met (plot 504) by operating the engine with the ejector throttle more open (e.g., fully open as depicted at plot 502). For example, the smaller vacuum requirement may be met by operating the engine in a first mode with the ejector throttle open. Therein, air may be flowed through an ejector positioned in a conduit coupled to the engine intake manifold, the conduit parallel to the air intake passage of the engine. While flowing air through the ejector, a throttle positioned in the conduit immediately upstream of the ejector, may be set to a more open position to raise a pressure in an upstream region of the ejector (that is, upstream of an ejector throat). By raising the pressure in the upstream region, a suction flow rate at the ejector is increased so that the desired vacuum level is quickly attained.

At t1, the vehicle speed may increase to a second, higher vehicle speed (plot 506). Due to the increase in vehicle speed, the desired vacuum level 503 may correspondingly increase to a higher level in anticipation of needing a higher amount of braking effort to brake the vehicle from the higher vehicle speed. However, the larger vacuum level required may not be met by operating the engine with the ejector throttle more open as the ultimate vacuum attainable with the ejector throttle open may be lower than the desired vacuum level. This, at t2, the desired vacuum level may be attained (plot 504) by operating the engine in a second mode with the ejector throttle closed (e.g., fully closed as depicted at plot 502). Therein, air may be flowed through the ejector positioned in the conduit coupled to the engine intake manifold while the throttle positioned in the conduit immediately upstream of the ejector is shifted from the more open position (before t1) to a more closed position (after t1) to lower a pressure in the upstream region of the ejector. By lowering the pressure in the upstream region, a suction flow rate at the ejector is decreased but the ultimate vacuum level attainable at the ejector is increased so that the desired vacuum level is attained by t2. At t2, once the desired vacuum level is achieved, the ejector throttle may be opened.

In this way, the engine is operated in a first mode (before t1) with the ejector throttle more open to pull-down vacuum at a higher rate (but to a lower level) and then operated in a second mode (after t1) with the ejector throttle more closed to pull-down vacuum to a higher level (but at a lower rate). In one example, the engine is operated only in the first mode to reach a desired vacuum level when the desired vacuum level is less than a threshold. As another example, the engine is operated only in the second mode to reach the desired vacuum level when the desired vacuum level is less than a threshold and while an intake manifold vacuum is higher than a threshold level (e.g., when manifold vacuum is high and brake booster vacuum is high).

Figure 6:
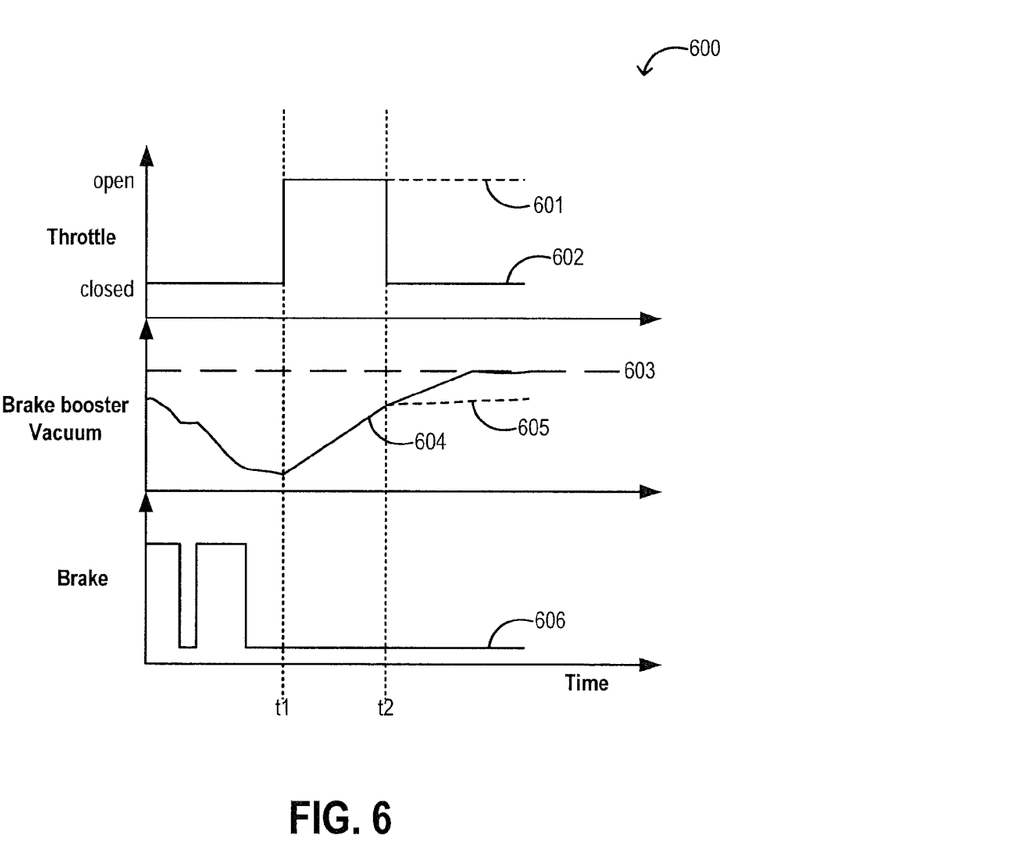

In still other examples, the engine may be operated in each of the first and second mode to reach the desired vacuum level, as elaborated now in the example of FIG. 6. Therein, over a given engine cycle, the engine is operated with each of the throttle more open and the throttle more closed to provide a faster vacuum pull-down as well as a deeper vacuum pull-down. In one example, the engine is operated in each of the first and second mode to reach a desired vacuum level when the desired vacuum level is more than a threshold.

Map 600 of FIG. 6 depicts changes to an ejector throttle position at plot 602. In the example of FIG. 6, the ejector is configured to provide vacuum to a brake booster. Map 600 depicts a brake booster vacuum level at plot 604 in relation to a desired (or threshold) vacuum level 603. Brake pedal application is shown at plot 606. All graphs are plotted over time along the x-axis.

At t0, a vacuum level available at the brake booster may be sufficiently high, for example at or just below a desired vacuum level 603. This may be due to sufficient vacuum having been previously generated at the ejector and stored at a vacuum reservoir coupled to the brake booster. Consequently, at t0, the engine may be operated with air flowing through the ejector while an ejector throttle coupled immediately upstream of the ejector is maintained in a more closed position (plot 602).

Between t0 and t1, the vehicle operator may apply a brake pedal multiple times (plot 606). As such, with each application of the brake pedal, vacuum may be consumed by the brake booster and vacuum level at the brake booster may drop (plot 604). At t1, the vacuum level at the brake booster may be substantially low. For example, a difference between the existing vacuum level and the desired vacuum level 603 may be more than a threshold amount. As such, this higher vacuum requirement may not be provided in a timely manner by the ejector while the throttle is closed.

Accordingly, at t1, the engine is operated in a first mode with the ejector throttle set to a position where it is open to a larger degree (relative to the degree of throttle opening prior to t1). Due to the throttle being more open, an air pressure upstream of the ejector's throat may be raised. Intake air may then flow through the ejector's throat with a higher flow velocity generating vacuum at a higher suction rate. This allows the brake booster vacuum level to be rapidly increased between t1 and t2. In other words, a faster rate of vacuum pull-down is achieved between t1 and t2 when the engine is operated in the first mode.

While the first mode of operation with the throttle more open allows vacuum to be pulled down at a faster rate, the ultimate vacuum achieved may not be sufficiently high. For example, at t2, the ejector may reach a vacuum limit which is below the desired vacuum level 603. Thus, if the engine were continued to operate in the first mode after t2 (as shown at dotted line 601), the ultimate vacuum achieved would plateau out below the desired vacuum level (as shown by dotted line 605).

Therefore, to achieve the desired vacuum, at t2, the engine is shifted to a second mode with the ejector throttle set to a position where it is open to a smaller degree (relative to the degree of throttle in the first mode, between t1 and t2). Due to the throttle being less open, an air pressure upstream of the ejector's throat may be lowered. Intake air may then flow through the ejector's throat with a lower flow velocity generating a deeper vacuum at a lower suction rate. This allows the brake booster vacuum level to slowly increase after t2 to desired vacuum level 603. In other words, a deeper vacuum pull-down at a slower rate of vacuum pull-down is achieved after t2 when the engine is operated in the second mode. Thus, a controller can generate vacuum at an ejector coupled to an intake manifold at a first, higher rate and to a first, lower vacuum level by increasing an opening of a throttle coupled upstream of the ejector; and then raise vacuum at the ejector from the first, lower level to a second, higher level at a second, lower rate by decreasing the opening of the throttle.

In this way, by including a throttle upstream of a system ejector, a simple and cost effective approach is provided for improving the vacuum generation efficiency of the ejector. By opening the throttle immediately upstream of the ejector, a rate of vacuum pull-down can be increased so that a rapid vacuum pump-down can be enabled during lower manifold vacuum conditions. By closing the throttle during high manifold vacuum conditions, a level of vacuum pull-down can be increased so that a deeper vacuum pump-down can be enabled at a slower pumping rate. As such, this enables the benefits of a higher vacuum pumping rate and a deeper ultimate vacuum level to be achieved using an existing engine system ejector. Overall, the vacuum generation efficiency of the ejector is enhanced.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The invention claimed is:

1. A method for an engine, comprising:
opening a throttle upstream of an ejector coupled to an intake manifold to increase a rate of vacuum generation by the ejector during a first mode of operation; and
closing the throttle upstream of the ejector to increase a level of vacuum generation by the ejector during a second mode of operation, the opening and closing of the throttle based on a desired vacuum level in a vacuum reservoir.

2. The method of claim 1, wherein the engine is operated only in the first mode to reach the desired vacuum level when the desired vacuum level is less than a threshold, and wherein the engine is operated in each of the first and second modes to reach the desired vacuum level when the desired vacuum level is more than the threshold.

3. The method of claim 2, wherein the threshold is based on a vacuum level that can be generated at a current throttle opening.

4. The method of claim 2, wherein the generated vacuum stored in the vacuum reservoir is used to actuate an engine vacuum consumption device, wherein the ejector includes an entraining inlet in communication with the vacuum reservoir, and wherein the desired vacuum level is based on a vehicle speed.

5. The method of claim 3, wherein the engine is operated only in the second mode to reach the desired vacuum level when the desired vacuum level is less than the threshold and when an intake manifold vacuum is higher than a threshold level.

6. The method of claim 1, wherein the ejector is coupled to the intake manifold in a conduit parallel to an air intake passage, the conduit coupled to the air intake passage upstream of a charge air cooler, and wherein the throttle upstream of the ejector is a first throttle that is positioned in the conduit immediately upstream of the ejector with no flow device or coupling in between the ejector and the first throttle.

7. The method of claim 6, further comprising, during each of the first and second mode of operation, adjusting an opening of a second throttle coupled to the intake manifold downstream of the charge air cooler based on the first throttle.

8. The method of claim 7, wherein the adjusting includes, when operating in the second mode, increasing the opening of the second throttle in response to the closing of the first throttle; and when operating in the first mode, decreasing the opening of the second throttle in response to an opening of the first throttle.

9. A method for an engine, comprising:
generating vacuum at an ejector coupled to an intake manifold at a first, higher rate and to a first, lower vacuum level by increasing an opening of a throttle coupled upstream of the ejector; and
raising vacuum at the ejector from the first level to a second, higher vacuum level at a second, lower rate by decreasing the opening of the throttle based on a desired vacuum level in a vacuum reservoir coupled to an engine vacuum consumption device.

10. The method of claim 9, wherein decreasing the opening of the throttle includes fully closing the throttle.

11. The method of claim 9, wherein the generating vacuum by opening the throttle and raising the vacuum by closing the throttle is in response to the desired vacuum level being at or higher than the second level.

12. The method of claim 10, wherein the generated vacuum is stored in the vacuum reservoir, and wherein the desired vacuum level is based on a vehicle speed.

13. The method of claim 9, wherein the throttle is a first throttle and wherein each of the ejector and the first throttle are coupled to the intake manifold upstream of a charge air cooler.

14. The method of claim 13, further comprising adjusting an opening of a second throttle coupled to the intake manifold downstream of the charge air cooler based on the opening of the first throttle.

15. The method of claim 14, wherein the adjusting includes, as the opening of the first throttle is increased, decreasing the opening of the second throttle, and as the opening of the first throttle is decreased, increasing the opening of the second throttle.

16. A vehicle system, comprising:
an engine including an intake manifold;
a compressor coupled to a charge air cooler;
a vacuum consumption device;
an ejector coupled to the intake manifold upstream of the charge air cooler;
a first throttle coupled upstream of the ejector; and
a controller with instructions for,
when a vacuum level at each of the intake manifold and the vacuum consumption device is higher than a threshold, closing the first throttle to reduce a pressure upstream of the ejector.

17. The system of claim 16, wherein closing the first throttle to reduce the pressure upstream of the ejector includes generating vacuum at the ejector and increasing the vacuum level of the vacuum consumption device at a first, slower rate.

18. The system of claim 17, further comprising a second throttle coupled to the intake manifold downstream of the charge air cooler, wherein the controller includes further instructions for increasing an opening of the second throttle responsive to the closing of the first throttle.

19. The system of claim 18, wherein the controller includes further instructions for opening the first throttle to increase the vacuum level of the vacuum consumption device at a second, faster rate; and reducing the opening of the second throttle responsive to an opening of the first throttle.

20. The system of claim 16, wherein the vacuum consumption device is a brake booster coupled to vehicle wheel brakes.

21. The system of claim 16, wherein the first throttle is pneumatically operated, and wherein closing the first throttle includes at least partially closing the first throttle in response to a pressure ratio of the ejector falling to or below a threshold ratio.

* * * * *